Patented Mar. 2, 1926.

1,574,776

UNITED STATES PATENT OFFICE.

RICHARD WILLSTÄTTER, OF MUNICH, GERMANY, AND HARRY SOBOTKA, OF NEW YORK, N. Y.

PROCESS FOR PRODUCING A YEAST PREPARATION.

No Drawing.   Application filed January 16, 1925.   Serial No. 2,921.

*To all whom it may concern:*

Be it known that we, RICHARD WILLSTÄTTER and HARRY SOBOTKA, citizens of Germany and Austria, respectively, residing at Munich, Germany, and New York city, N. Y., U. S. A., respectively, have invented new and useful Improvements in Processes for Producing a Yeast Preparation, of which the following is a specification.

Our invention relates to a process for producing a yeast preparation, and more specifically, one which will be suitable for bakers' and brewers' purposes.

It is well known that yeast can be liquefied by addition of certain soluble substances, such as salt or sugar. For example, if one part of finely powdered sugar is added to ten parts of yeast, spontaneous liquefaction occurs, followed by fermentation.

It is a surprising fact, however, that if a larger proportion of sugar is used, such as, for example, an equal amount, liquefaction will occur as before but fermentation will not follow. This fact we have described and claimed in our Patent No. 1,538,366, issued May 19, 1925. A durable, yellowish or brown mass is obtained which contains many of the yeast cell constituents in a dissolved, but otherwise unchanged, state, and including the enzymes and the vitamines. This substance is not suitable as an article of food, however, since it has the flavor of yeast.

By our process, however, as described in the above-mentioned patent we have succeeded in altering this flavor in a quite astonishing manner by subjecting the mixture to a heat treatment. The distinctive yeast flavor disappears, and the flavor changes to one which is pleasant and aromatic, somewhat like that of honey. This change is caused, briefly, by the fact that the sugar acting upon the yeast during the heating process causes the yeast cells to empty entirely, whereupon the released enzymes and other constituents effect an inversion of the sugar. The ensuing combination of invert sugar with the nitrogenous constituents of the yeast in the course of the heating produces valuable flavoring substances, somewhat as in the case of roast malt. We will describe our theory of these changes more fully hereinafter.

The heat treatment to which we subject the yeast flavored mixture above-mentioned consists substantially in slowly raising the temperature step by step to about 100° C. Inasmuch as we have ascertained that the process may best be carried out by the use of any of the disaccharides or a mixture thereof, the magnitude of the steps of heating and their duration, will depend upon the particular sugar used. A typical example of our process, using maltose as the sugar, is as follows:

100 kg. of well-washed and powerfully pressed brewers' yeast, containing preferably about 25 or 30% of dry matter, are placed in a kneading apparatus having a heating appliance. Maltose, preferably in the form of crystallized concentrated malt extract, is quickly added thereto in at least an equal proportion by weight, say 150 kg., and quickly mixed therewith. The liquefied mass is continuously kneaded, and in the course of about an hour the temperature is slowly raised to about 55° C. This temperature is maintained for approximately an hour and then during the course of another hour it is raised to about 100° C. and preferably maintained there for another hour. Then the mass is cooled, and the finished product is a thick brown liquid extract of very pleasant flavor.

We believe that the slow heating to about 55° C. effects a continuation of plasmolysis, which is only imperfectly effected by any cold liquefaction process. This may be demonstrated by diluting the products both before and after heating. The cold mixture allows itself to be divided, after such dilution, into a sugar solution containing at most one-third of the yeast substance, and into a sediment of cells which may be easily separated, the weight of this sediment being very little less than the weight of the original yeast. In the case of the heated product, however, no amount of dilution will effect any separation, and the mass is entirely homogeneous, it being apparently impossible to separate any sugar therefrom by any means.

In the course of this continued and complete plasmolysis the contents of the yeast cells are broken down by their own enzymes in a gradual and careful manner, an effect which cannot be produced either by chemical agents (such as acids or alkalis) or by antiseptics such as acetic ether. Moreover, in contradistinction to the bad effect of strong reagents upon the taste of the product, our process of exclusively physiological plasmolysis causes the yeast flavor to disappear and a pleasant aromatic flavor to be produced. Further, inasmuch as heating also causes diminution of viscosity and acceleration of enzymatic action, the sugar is rapidly and completely inverted by the sucrase. The cell walls have been emptied of their contents (which is entirely converted into soluble substances), and appear like clear shadows under the microscope.

Typical chemical combinations are then formed between the degradation products of the yeast protein (such as albumoses, peptids, amino acids, etc.,), and the inversion products of the sugar. As these chemical reactions proceed, temperature exceeding 100° C. may sometimes be reached. These well defined chemical products, contituting valuable flavoring substances, distinguish our invention from existing yeast preparations.

When maltose is the disaccharide chosen to be used, it is preferable to utilize it in a commercially available form, and we have found that crystallized malt extract is most suitable. Inasmuch as maltase, which is the enzyme which hydrolyses maltose, is very easily destroyed by heat, or even by the mere process of plasmolysis, an excess of unaltered maltose will result and the combination thereof (and of the unaltered dextrin substances in the malt extract) with the nitrogenous derivatives of the yeast, will result in an analogous manner in a product like that described above in the case of inverted sugar.

It follows from the fact that invert sugar is produced in the course of the process, and from the theory that this invert sugar reacts upon the nitrogenous constituents of the yeast, that invert sugar may be used originally in place of maltose or cane sugar or other disaccharide, but such use will not be as economically satisfactory as the processes already described.

We have pointed out that if sugar is added to yeast in the proportion of 10 parts of yeast to 1 part of sugar, fermentation will occur, whereas if the sugar is added in a proportion of 1:1, no fermentation will occur. We have ascertained further that the minimum amount of sugar which may be used without causing fermentation is 25-30% of the entire mixture, i. e., 10 parts of yeast require a minimum 3.3-4.3 parts of sugar for the carrying out of our process. Apparently any amount of sugar in excess of this amount may be used, and in fact we prefer to use about 15 parts of sugar to 10 of yeast.

Our finished product is especially well adapted for baking purposes because of its enzyme content, which will be preserved if care is used in the heating process. The vitamine content is also advantageous in the preparation of dough, and the presence of the nitrogenous derivatives such as amino acids, stimulants, ethers, and genuine albuminous matters, is exceedingly favorable for fermentation purposes. Where cane sugar has been the sugar used, the fructose which results from the inversion is easily caramelized and improves and assists the rapid browning of the crust. It also improves the aroma.

When our preparation is added to pies and cakes made with baking powder, and to ginger bread or other sweetened confectionery, it imparts the pleasant aroma of articles baked with yeast, and it serves as a partial or complete substitute for sugar. It may also be used in connection with known preparations, such as enzymatic malt extract, and improves their action.

The product is distinguished from the vitamine preparations now in use by its excellent flavor, and is suitable also for therapeutic purposes. In the case of catarrhic affections, for example, it has a favorable effect upon the mucuous membranes of the respiratory organs. It is a mild laxative. Particularly does it afford in a high degree the well known benefits derivable from yeast vitamines.

It may be prepared in the liquid state, or in the form of a viscous fluid such as honey or malt extract; or it may be made up in the form of jelly or sweets; or it may be subjected to a drying process and reduced to a powder; or prepared for use and consumption in any other known manner.

In Patent No. 1,538,366, issued to us May 19th, 1925, we have described and claimed a process of producing a yeast preparation in which sugar is broadly referred to as one of the ingredients employed in forming the mixture, and by the present application we purpose to claim disaccharides other than cane sugar, and to claim maltose specifically.

It will be understood that the constituents may be used in a state commercially available. Accordingly, the word "maltose" in the following claims is intended to cover the commercial forms thereof, such as malt extract.

What we claim is:

1. The process of producing a yeast preparation rich in vitamines and enzymes, which consists in mixing with yeast at least one-third of its weight of a disaccharide other than cane sugar to initiate plasmolysis of the yeast, and continuing and completing the plasmolysis by heating the mixture.

2. The process of producing a yeast preparation, as claimed in claim 1, in which said heating operation is accomplished step by step to a temperature exceeding 60° C.

3. As an article of manufacture, a yeast preparation for bakers' or brewers' use, which consists of yeast and a disaccharide other than cane-sugar mixed therewith in a proportion which produces liquefaction but not fermentation.

4. An article of manufacture for use as a baking or brewing preparation, consisting of yeast and a disaccharide other than cane-sugar mixed therewith with application of heat in a proportion which produces liquefaction but not fermentation.

5. The process of producing a yeast preparation, as claimed in claim 1, in which said sugar consists of maltose.

6. The process of producing a yeast preparation rich in vitamines and enzymes, which consists in causing yeast cells to empty by plasmolysis effected by the addition of a disaccharide other than cane sugar in a quantity sufficient to prevent fermentation, heating the mixture sufficiently slowly to cause the released enzymes to hydrolyze the latter, and to allow the invert sugar to react with the released nitrogenous constituents of the yeast cells, and then cooling the mass.

7. An article of manufacture for use as a baking or brewing preparation consisting of yeast and at least one-third of its weight of maltose mixed therewith.

In testimony whereof we affix our signatures.

RICHARD WILLSTÄTTER.
HARRY SOBOTKA.